United States Patent [19]

Hiyama et al.

[11] Patent Number: 4,626,621

[45] Date of Patent: Dec. 2, 1986

[54] CIRCUIT FOR GENERATING A POSITION IN DIGITAL FORM

[75] Inventors: Yasuhiro Hiyama; Kyoichi Fujimori, both of Higashimatsuyama, Japan

[73] Assignee: Diesel Kiki Co., Ltd., Japan

[21] Appl. No.: 640,168

[22] Filed: Aug. 10, 1984

[30] Foreign Application Priority Data

Aug. 10, 1983 [JP] Japan ................................. 58-145059
Sep. 2, 1983 [JP] Japan ................................. 58-160250

[51] Int. Cl.$^4$ ........................ G01B 7/00; G08C 19/08
[52] U.S. Cl. ................................ 178/18; 340/347 SY; 340/870.31
[58] Field of Search .................... 178/19, 18; 324/207, 324/208; 73/314, 658; 116/209, 204; 336/30, 45; 340/870.19, 870.31, 347 AD, 347 SY; 318/660

[56] References Cited

U.S. PATENT DOCUMENTS 4,364,045 12/1982 Spiegel ........................... 340/870.31

Primary Examiner—Stafford D. Schreyer
Attorney, Agent, or Firm—Guy W. Shoup

[57] ABSTRACT

A circuit for generating a position signal has a detector having a detecting coil whose inductance varies in accordance with the position of an object which generates a first pulse response signal relating to the inductance of the detecting coil in response to the pulse signal, another detector having a constant inductance coil which generates a second pulse response signal relating to the inductance of the constant inductance coil in response to the pulse signal, and a circuit for producing a digital signal showing the ratio of the inductances of the detecting coil and the constant inductance coil as position data in response to at least the first and the second pulse response signals. The position signal can be directly obtained in digital form and the change in the inductances due to temperature change can be canceled out to obtain position data with high accuracy.

6 Claims, 13 Drawing Figures

CIRCUIT FOR GENERATING A POSITION IN DIGITAL FORM

BACKGROUND OF THE INVENTION

1. Field of the Invention

The present invention relates to a circuit for generating a position signal, and more particularly to a circuit for generating a position signal which is able to produce a signal in digital form corresponding to the position of an object under detection.

2. Description of the Prior Art

In general, in the conventional position detecting circuit for generating an electric signal corresponding to the position of an object, as shown in U.S. Pat. No. 4,358,762 or Japanese Patent Publication No. Sho 56-46402, for example, a sinusoidal wave signal is applied to a series circuit consisting of a reference coil and a detecting coil which is connected with a member whose position is to be detected so as to vary its inductance in accordance with the position of the member and the sinusoidal wave signal developed across the detecting coil, the level of which corresponds to the position of the member, is converted into a corresponding d.c. voltage signal which is output as a position signal.

However, when such a position detecting circuit is employed in a control system using a microprocessor, it is necessary to provide an analog-digital converter for converting the d.c. voltage signal produced from the position detecting circuit into a corresponding signal in digital form. Consequently, the circuit arrangement of the position detecting circuit becomes complex and the manufacturing cost increases.

Moreover, in the conventional position detecting circuit, the level of the d.c. output voltage showing the position of the object under detection is liable to change due to the change in ambient temperature, so that the detecting accuracy of the position detecting circuit is low.

SUMMARY OF THE INVENTION

It is therefore an object of the present invention to provide an improved circuit for generating a position signal directly in digital form.

It is another object of the present invention to provide a circuit for generating a position signal, in which the position of the object under detection can be detected by a circuit of simple structure with high accuracy and the detected result can be directly obtained in digital form.

It is a further object of the present invention to provide a circuit for generating a position signal which operates stably and detects the position of the object with high accuracy even if the condition of operation varies.

The circuit for generating a position signal of the present invention comprises means for generating a pulse signal, a first detecting means which includes a first coil whose inductance varies in accordance with the position of an object under detection and generates a first pulse response signal relating to the inductance value of the first coil in response to the pulse signal, a second detecting means which inludes a second coil with a constant inductance value and generates a second pulse response signal relating to the inductance value of the second coil in response to the pulse signal, and an output means for producing a digital signal corresponding to the ratio between the inductance value of the first coil and that of the second coil in response to at least the first and the second pulse response signals.

In a preferred embodiment, the output means has means responsive to the first pulse response signal and the pulse signal for producing a first digital signal corresponding to the inductance value of the first coil, means responsive to the second pulse response signal and the pulse signal for producing a second digital signal corresponding to the inductance value of the second coil, and a computing means for computing the ratio between the first digital signal and the second digital signal, whereby the output digital data from the computing means can be utilized as position data.

In this structure, it is possible to obtain the first and second pulse response signals as signals whose rising characteristics vary in response to the inductances of the corresponding coils, and to obtain the first digital signal as a signal indicative of the time between the rising time of the pulse signal and the time the level of the first pulse response signal reaches a predetermined level. A circuit for producing the first digital signal in response to the first pulse response signal described above can be arranged by the use of a voltage comparator and an IC having counting function, for example.

The second digital signal can also be obtained as a signal indicative of the time between the rising time of the pulse signal and the time the level of the second pulse response signal reaches a predetermined level. Similarly to the case of the first digital signal, a circuit for producing the second digital signal in response to the second pulse response signal described above can be arranged by the use of a voltage comparator and an IC having counting function.

According to the circuit structure described above, a position signal can be directly obtained in digital form, and moreover, since the position signal is obtained on the basis of the ratio of the first digital signal based on the inductance value of the first coil to the second digital signal based on the inductance value of the second coil, the changes in the inductance due to temperature change can be canceled out to obtain position data with high accuracy.

In another preferred embodiment, the output means has a switching means for alternately taking out the first pulse response signal and the second pulse response signal, a pulse signal generating means responsive to the output signal from the switching means for alternately generating a first pulse signal with a period corresponding to the inductance value of the first coil and a second pulse signal with a period corresponding to the inductance value of the second coil, means for applying the output pulse signal from the pulse signal generating means as a synchronizing signal to the pulse generator, and a computing means for computing the ratio between the inductance value of the first coil and that of the second coil in response to the first and second pulse signals, whereby the output digital data from the computing means can be utilized as position data.

The invention will be better understood and the other objects and advantages thereof will be more apparent from the following detailed description of a preferred embodiment with reference to the accompanying drawings.

DESCRIPTION OF THE PREFERRED EMBODIMENTS

Figure 1:
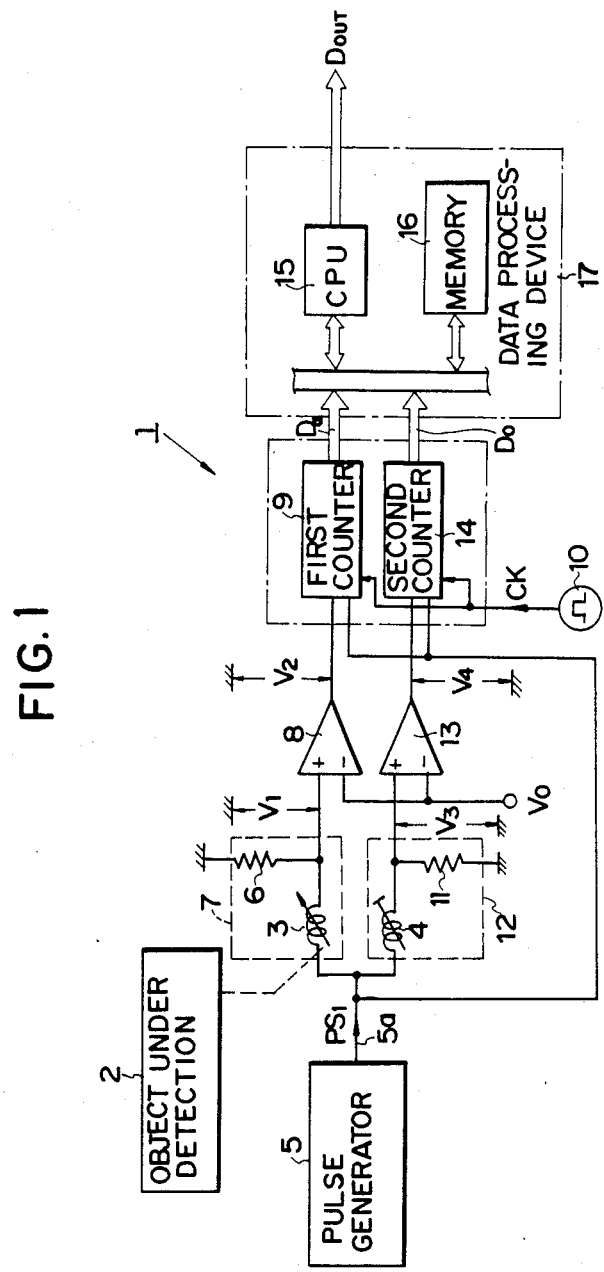
FIG. 1 is a circuit diagram of an embodiment of a circuit for generating a position signal according to the present invention.

FIG. 1 shows an embodiment of the position signal generating circuit of the present invention. The position signal generating circuit 1 is a circuit for obtaining a signal representing the position of an object under detection in digital form and includes a detecting coil 3 connected with an object 2 whose position is to be detected and a reference coil 4. The inductance $L_a$ of the detecting coil 3 varies in accordance with the position of the object 2 and the inductance of the reference coil 4 is fixed at a constant value $L_o$ regardless of the position of the object 2.

Figure 2:
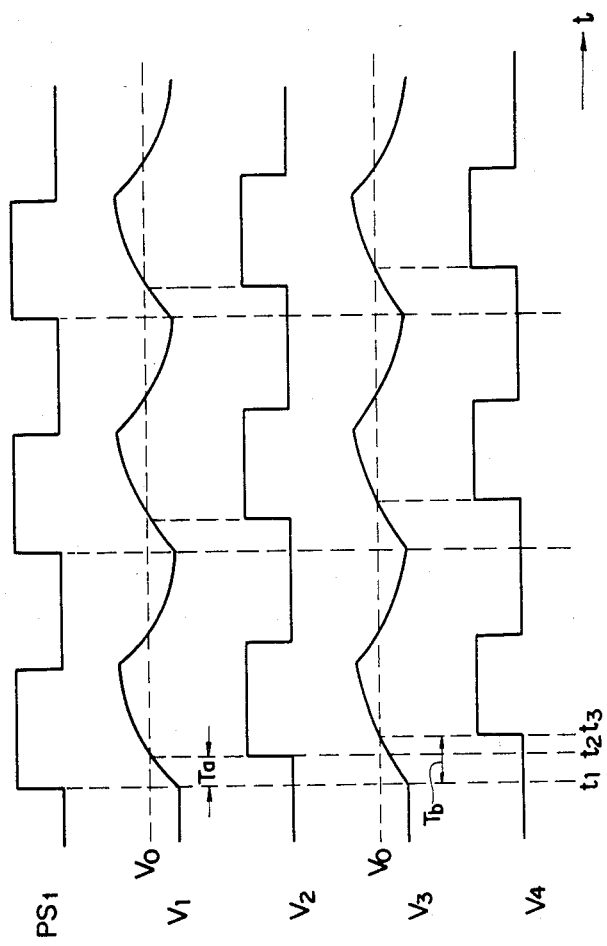
FIG. 2A to FIG. 2E are waveforms of signals in the circuit of FIG. 1.

The detecting coil 3 is connected at its one end to an output line 5a of a pulse generator 5 and its other end is grounded through a resistor 6. A repetitive pulse signal $PS_1$ (see FIG. 2A) generated from the pulse generator 5 is applied to a first circuit 7 consisting of the detecting coil 3 and the resistor 6, whereby a first output voltage $V_1$ is developed across the resistor 6, the rising-up characteristic of which varies in accordance with the inductance value of the detecting coil 3. The first output voltage $V_1$ is a voltage signal generated in response to the application of the repetitive pulse signal $PS_1$, and, as shown in FIG. 2B, the level of the first output voltage $V_1$ increases in response to the rising of the level of the repetitive pulse signal $PS_1$ and decreases in response to the falling of the level thereof. As will be understood from the above description, the rising and falling characteristics of the level of the first output voltage $V_1$ depend upon the time constant determined by the inductance $L_a$ of the detecting coil 3, the direct-current resistance value of the detecting coil 3 and the resistance value of the resistor 6. In this case, since the direct-current resistance value of the detecting coil 3 and the resistance value of the resistor 6 are each constants, it follows that the rising and falling characteristics of the first output voltage $V_1$ vary in accordance with the inductance value of the detecting coil 3, in other words, in accordance with the position of the object 2.

For detecting whether or not the level of the first output voltage $V_1$ exceeds a predetermined reference voltage level, the first output voltage $V_1$ is applied to the positive input terminal of a voltage comparator 8 which has a reference voltage $V_0$ applied to its negative input terminal. Consequently, the level of the output voltage $V_2$ of the voltage comparator 8 is approximately equal to the ground level when $V_0 \geq V_1$, whereas it rises approximately to the level of the voltage source when $V_0 < V_1$. The level of the reference voltage $V_0$ being as shown by the broken line in FIG. 2B, the level of the output voltage $V_2$ is changed as shown in FIG. 2C. As described above, since the rising characteristic of the first output voltage $V_1$ is changed in accordance with the inductance of the detecting coil 3, it follows that the period $T_a$ from time $t_1$ at which the level of the pulse signal $PS_1$ begins to rise to the time $t_2$ at which $V_1 = V_0$, in other words, the period from the time that the level of the pulse signal $PS_1$ begins to rise to the time that the level of the corresponding output voltage $V_2$ begins to rise, changes in accordance with the inductance of the detecting coil 3. That is, the period $T_a$ changes in relation to the position of the object 2.

For obtaining digital data representing the period $T_a$, there is provided a first counter 9 to which a clock pulse signal CK is applied from a clock generator 10. Furthermore, the pulse signal $PS_1$ and the output voltage $V_2$ are applied to the first counter 9 as a count-start signal and a countstop signal, respectively. The first counter 9 is reset and starts to count the clock pulse signal CK at each rising time of the pulse signal $PS_1$ and the counting operation of the first counter 9 is stopped at the rising time of the output voltage $V_2$. Therefore, the first counter 9 counts the number of pulses of the clock pulse signal CK applied to the first counter 9 during the time between the rising time of the pulse signal $PS_1$ and the rising time of the corresponding output voltage $V_2$. As a result, digital data $D_a$ showing the period $T_a$ is output from the first counter 9.

On the other hand, the reference coil 4 is connected in series with a resistor 11 to form a second circuit 12 which produces a second output voltage $V_3$ whose rising characteristic depends upon the inductance $L_0$ of the reference coil 4 in response to the pulse signal $PS_1$ in a similar way to the first circuit 7 (see FIG. 2D).

To detect whether or not the level of the second output voltage $V_3$ exceeds a predetermined reference voltage level, the second output voltage $V_3$ is applied to the positive input terminal of a voltage comparator 13 which has the reference voltage $V_0$ applied to its negative input terminal. Consequently, the level of the output voltage $V_4$ of the voltage comparator 13 is approximately equal to the ground level when $V_0 \geq V_3$, whereas it rises approximately to the level of the voltage source when $V_0 < V_3$. The level of the reference voltage $V_0$ being as shown by the broken line in FIG. 2D, the level of the output voltage $V_4$ is changed as shown in FIG. 2E. As described above, since the rising characteristic of the second output voltage $V_3$ depends upon the inductance of the reference coil 4, it follows that the period $T_b$ from time $t_1$ at which the level of the pulse signal $PS_1$ begins to rise to the time $t_3$ at which the level of the second output voltage $V_3$ becomes equal to $V_0$, in other words, the period $T_b$ from the time that the level of the pulse signal $PS_1$ begins to rise to the time that the level of the corresponding output voltage $V_4$ begins to rise, depends upon the inductance of the reference coil 4.

For obtaining digital data representing the period $T_b$, there is provided a second counter 14 to which the clock pulse signal CK is applied from the clock generator 10. Furthermore, the pulse signal $PS_1$ and the output voltage $V_4$ are applied to the second counter 14 as a count-start signal and a count-stop signal, respectively. As a result, similarly to the first counter 9, digital data $D_0$ showing the period $T_b$ is output from the second counter 14.

The inductance value of the reference coil 4 being fixed, the value of $T_b$ is constant regardless of the position of the object 2. However, the value of $T_b$ is affected by the changes in temperature and/or the crest value of the pulse signal $PS_1$ at the same time and to the same degree as these changes affect the value of $T_a$.

This fact can be utilized for eliminating errors due to changes in temperature and the crest value of the pulse signal $PS_1$, and for this purpose the data $D_a$ and $D_0$ are applied to a data processing device 17 having a central processing unit (CPU) 15 and a memory 16. The data processing device 17 calculates $T_a/T_b$ from $D_a$ and $D_0$ and outputs the resulting data $D_{out}$ as data showing the position of the object 2.

When the calculation of $T_a/T_b$ is carried out as described above by utilizing the data $D_0$ obtained by the use of the reference coil, it is possible to prevent errors from arising in the data showing the position of the object 2 because of changes in temperature and/or the level of the pulse signal $PS_1$. As a result, extremely accurate detection of the position of the object can be realized with relatively simple circuit structure.

In addition, with this circuit arrangement, it is possible to realize easy adjustment of the position signal generating circuit 1 per se by employing variable elements for the resistors 6 and 11. That is, the adjustment of the circuit 1 can be carried out by adjusting the resistors 6 and 11 so as to obtain a predetermined value of data $D_{out}$ when the object 2 is at a predetermined position. When the position signal generating circuit 1 is used for detecting the position of the fuel adjusting member of a fuel injection pump for an internal combustion engine, if all or a part of the position signal generating circuit 1 is built in the fuel injection pump, it is possible to carry out trimming of the resistors 6 and 11 for the adjustment of the amount of fuel injected and the position data.

Furthermore, since the position signal indicating the position of the object 2 can be directly obtained in the form of a digital signal, when the circuit 1 is used for detecting the position of the fuel adjusting member of an electrically controlled type fuel injection pump with a microcomputer, it is possible to use the data $D_{out}$ as it is as feedback data to be applied to the microcomputer.

In place of the data processing device 17, it is possible to use any other digital processing device capable of carrying out calculation of $T_a/T_b$ in the digital form from data $D_0$ and $D_a$ to produce the resulting output data in digital form.

Figure 3:
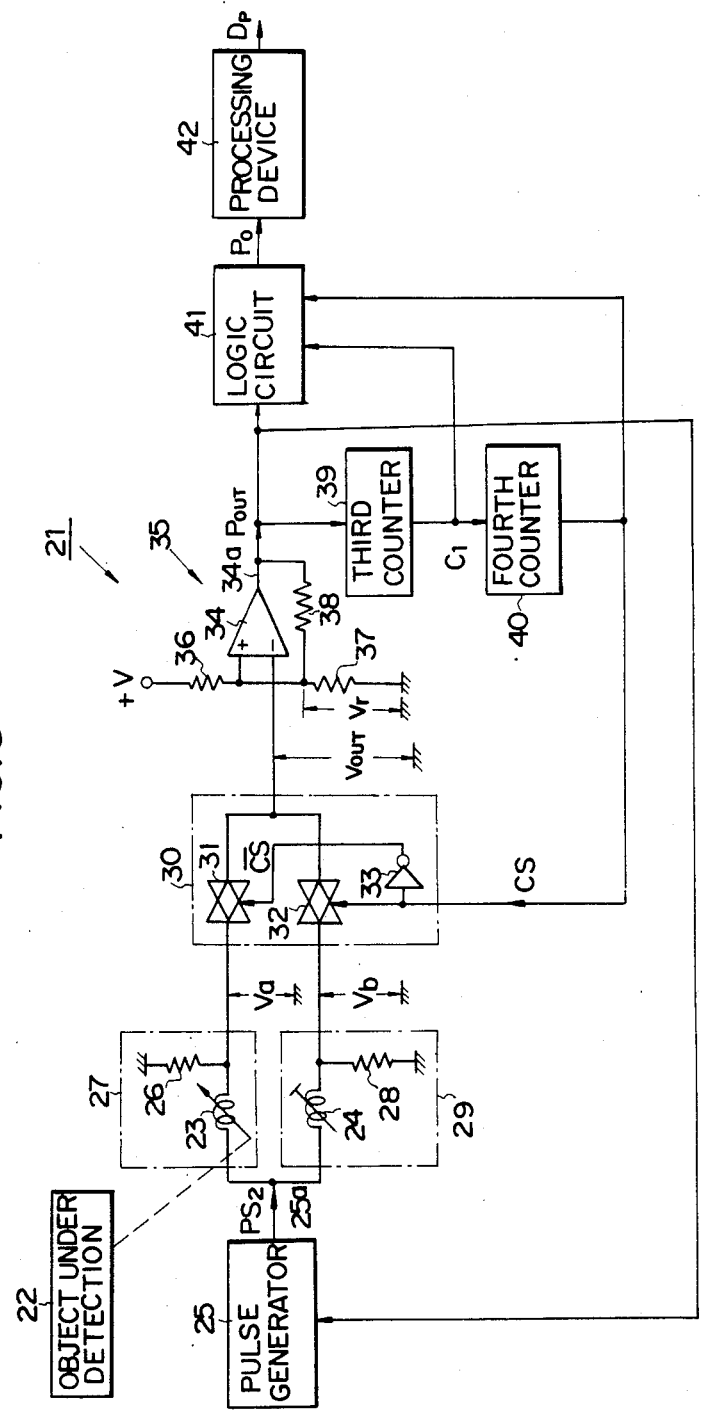
FIG. 3 is a circuit diagram of another embodiment of a circuit for generating a position signal according to the present invention.

FIG. 3 shows another embodiment of the position signal generating circuit of the present invention. The position signal generating circuit 21 is a circuit for obtaining a signal representing the position of an object 22 in digital form and includes a detecting coil 23 connected with the object 22 and a reference coil 24. The inductance $L_a$ of the detecting coil 23 varies in accordance with the position of the object 22 and the inductance of the semifixed reference coil 24 is set at a constant value $L_o$ regardless of the position of the object 22.

The detecting coil 23 is connected at its one end to an output line $25_a$ of a pulse generator 25 and its other end of the detecting coil 23 is grounded through a resistor 26. A repetitive pulse signal $PS_2$ (see FIG. 4A) generated from the pulse generator 25 is applied to a first circuit 27 consisting of the detecting coil 23 and the resistor 26, whereby an output voltage $V_a$ is developed across the resistor 26, the rising-up characteristic of which varies in accordance with the inductance value of the detecting coil 23. The output voltage $V_a$ is generated in response to the application of the repetitive pulse signal $PS_2$ and its level increases in response to the rising of the level of the repetitive pulse signal $PS_2$ and decreases in response to the falling of the level thereof. As will be understood from the above description, the rising and falling characteristics of the level of the output voltage $V_a$ depend upon the time constant determined by the inductance $L_a$ of the detecting coil 23, the direct-current resitance value of the detecting coil 23 and the resistance value of the resistor 26. In this case since the direct-current resistance value of the detecting coil 23 and the resistance value of the resistor 26 are each constants, it follows that the rising and falling characteristics of the output voltage $V_a$ vary in accordance with the inductance value of the detecting coil 23, in other words, in accordance with the position of the object 22.

On the other hand, the reference coil 24 is connected in series with a resistor 28 to form a second circuit 29 which in response to the pulse signal $PS_2$ produces an output voltage $V_b$ with rising and falling characteristics corresponding to the inductance value $L_o$ of the reference coil 24.

The output voltage $V_a$ and $V_b$ are applied to a signal switching circuit 30 for selectively deriving the output voltage $V_a$ or $V_b$ in response to a switching control signal CS shown in FIG. 4D. The signal switching circuit 30 has an analog switch element 31 to which the output voltage $V_a$ is applied and another analog switch element 32 to which the output voltage $V_b$ is applied. The switching control signal CS is directly applied to the analog switch element 32 and the inverted signal $\overline{CS}$ of the switching control signal CS is applied to analog switch element 31 through an inverter 33. These analog switch elements 31 and 32 are in closed condition when the level of the applied control signal is "H", whereas they are in open condition when the level is "L". Therefore, when the level of the switching control signal CS is "H", only the analog switch element 32 is closed to output the output voltage $V_b$ from the signal switching circuit 30. When the level of the switching control signal CS if "L", only the analog switch element 31 is closed to output the output voltage $V_a$ therefrom. As a result, in response to the application of the switching control signal CS, the level of which is changed alternately as shown in FIG. 4D, the output voltages $V_a$ and $V_b$ are alternately derived from the signal switching circuit 30.

Therefore, an output voltage $V_{out}$ composed of alternate signal blocks $M_1$, $M_2$, . . . consisting of output voltages $V_a$ and signal blocks $N_1$, $N_2$, . . . consisting of output voltages $V_b$ as shown in FIG. 4B, is output from the signal switching circuit 30.

To obtain a first pulse signal with a period corresponding to the inductance value of the detecting coil 23 and a second pulse signal with a period corresponding to the inductance value of the reference coil 24 in response to the output voltages $V_a$ and $V_b$ constituting the output voltage $V_{out}$, there is provided a pulse generating circuit 35 having a voltage comparator 34.

The output voltage $V_{out}$ from the signal switching circuit 30 is applied to the negative input terminal of the voltage comparator 34 and a constant voltage $V_r$ produced by dividing a d.c. source voltage $+V$ by the use of resistors 36 and 37 is applied to the positive input terminal of the voltage comparator 34. A feedback resistor 38 is connected between the positive input terminal and the output terminal of the voltage comparator 34. Consequently, the output voltage $V_{out}$ from the signal switching circuit 30 is compared with the constant voltage $V_r$ in level. The level of the output line $34a$ of the voltage comparator 34 becomes "L" when $V_{out} \geq V_r$, and becomes "H" when $V_{out} < V_r$. The output pulse signal $P_{out}$ from the voltage comparator 34 is supplied to the pulse generator 25 as a synchronizing signal and the pulse train signal synchronized with the output pulse signal from the voltage comparator 34 is produced as the pulse signal $PS_2$ from the pulse generator 25. Therefore, the waveform of the output pulse signal $P_{out}$ from the voltage comparator 34 becomes equal to that of the pulse signal $PS_2$ and the waveform is as shown in FIG. 4A.

That is, when the analog switch element 31 is closed, an oscillating circuit loop including the pulse generator 25 and the detecting coil 23 is arranged and the pulse signal $PS_2$ is produced from the pulse generator 25 in synchronization with the output pulse signal $P_{out}$. On the other hand, when the analog switch element 32 is closed, another oscillating circuit loop including the pulse generator 25 and the reference coil 24 is arranged and the pulse signal $PS_2$ is produced from the pulse generator 25 in synchronization with the output pulse signal $P_{out}$. It is possible to supply a timing signal indicating the rising and falling timing of the output pulse signal $P_{out}$ in place of the output pulse signal $P_{out}$.

To produce the switching control signal CS on the basis of the output pulse signal $P_{out}$, the position signal generating circuit 21 has a third counter 39 and a fourth counter 40 on the output side of the pulse generating circuit 35. The third counter 39 is a binary counter, so that the level of the output pulse $C_1$ is inverted every time two pulses are applied thereto (see FIG. 4E). The output pulse $C_1$ is applied to the fourth counter 40 to produce the switching control signal CS the level of which is inverted every time three pulses of the output pulse $C_1$ are input thereinto. Consequently, it follows that the level of the switching control signal CS is inverted into the opposite level once every six pulses of the output pulse signal $P_{out}$ (see FIG. 4D).

Figure 4:
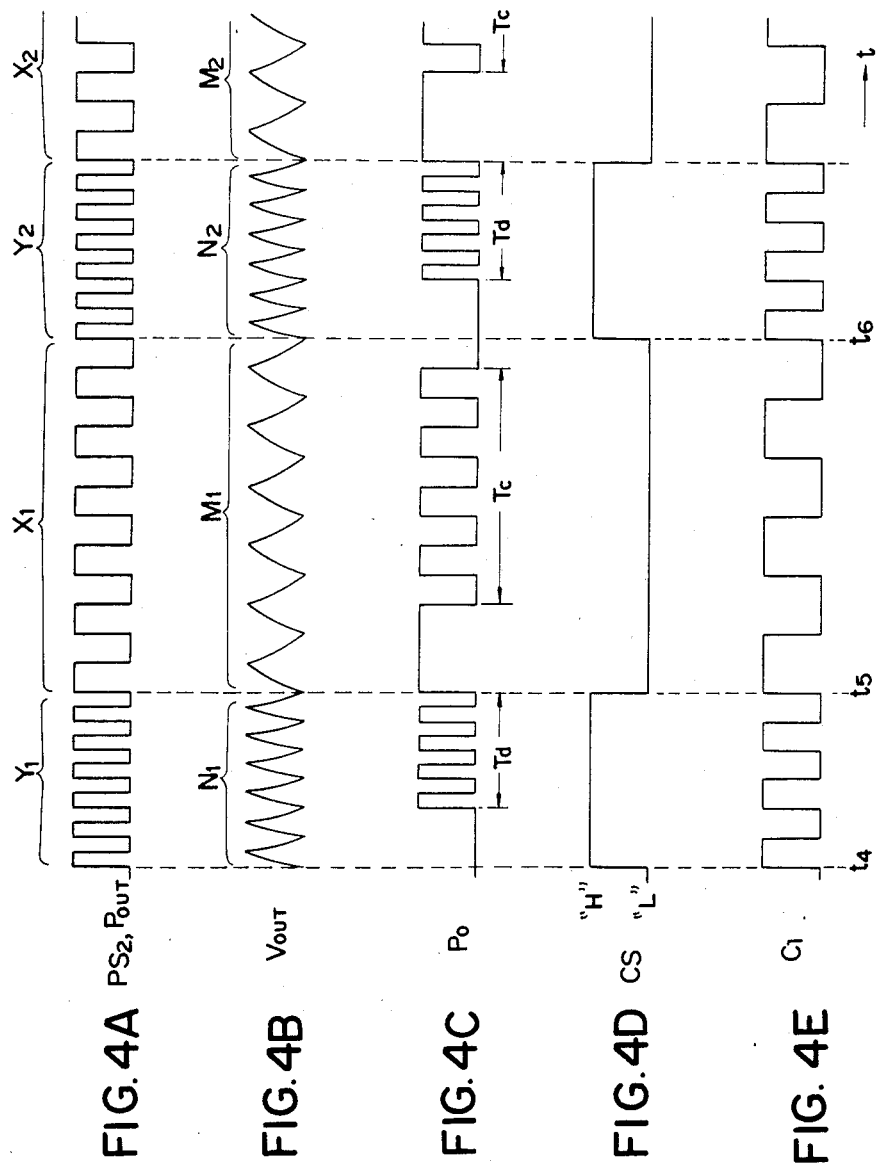
FIG. 4A to FIG. 4E are waveforms of signals in the circuit of FIG. 3.

An explanation will now be given with reference to FIG. 4 as to how the signal with the waveform shown in FIG. 4A is obtained as the output pulse signal $P_{out}$.

When the level of the switching control signal CS is changed from "L" to "H" at $t_4$, the output voltage $V_b$ is produced from the signal switching circuit 30 and the second pulse signal based on the output voltage $V_b$ is produced as the output pulse signal $P_{out}$ from the pulse generating circuit 35. The second pulse signal is applied to the pulse generator 25 as a synchronizing signal to produce the second pulse signal with a period corresponding to the inductance value $L_0$ of the reference coil 24. The second pulse signal is applied to the third counter 39 to count the number of the second pulse signal and the output pulse $C_1$ is supplied to the fourth counter 40. At the time $t_5$ the output of six pulses composing the second pulse signal has just finished, and the level of the switching control signal CS becomes "L". Consequently, the second pulse signal is produced as the output pulse signal $P_{out}$ during the period between $t_4$ and $t_5$.

When the level of the switching control signal CS becomes "L" at $t_5$, the output voltage $V_a$ is derived from the signal switching circuit 30 and the first pulse signal is produced from the pulse generating circuit 35 in accordance with the output voltage $V_a$. The period of the first pulse signal depends upon the inductance value $L_0$ of the detecting coil 23 and the first pulse signal is also applied as a synchronizing signal to the pulse generator 25.

The level of the switching control signal CS is changed from "L" to "H" again at time $t_6$ when the output of six pulses composing the first pulse signal has just finished, so that the second pulse signal is produced again.

As will be seen from the foregoing description, the second pulse signal consisting of six pulses whose period changes in accordance with the inductance of the reference coil 24 and the first pulse signal consisting of six pulses whose period changes in accordance with the inductance of the detecting coil 23, are alternatively produced from the pulse generating circuit 35, and the pulse train signal alternately including the first pulse signal and the second pulse signal is derived as the output pulse signal $P_{out}$.

The output pulse signal $P_{out}$, the output pulse $C_1$ from the third counter 39 and the switching control signal CS are applied to a logic circuit 41 and channel identifications are added to each of first pulse groups $X_1, X_2, \ldots$ which are composed of the first pulse signal and each of second pulse groups $Y_1, Y_2, \ldots$ which are composed of the second pulse signal in the output pulse signal $P_{out}$ on the basis of these signals and pulses.

In FIG. 4C, there is shown the waveform of a synthetic output pulse signal $P_0$ to which the channel identifications are added. As will be seen from FIG. 4C, these channel identifications are provided by adding an "H" or "L" level signal of a time length of two or one and one-half periods of the pulse signals constituting the respective pulse groups to the head portion of the output pulse signal $P_{out}$. In this embodiment, "H" level signals with a time length of one and one-half periods of the corresponding pulse signals are added to the first pulse groups $X_1, X_2, \ldots$ consisting of the first pulse signal to indicate that these pulse groups $X_1, X_2, \ldots$ correspond to the "L" level period of the switching control signals CS. On the other hand, "L" level signals with a time length of two periods of the corresponding pulse signals are added to the second pulse groups $Y_1, Y_2, \ldots$ consisting of the second pulse signal to indicate that these pulse groups $Y_1, Y_2, \ldots$ correspond to the "H" level period of the switching control singnal CS.

The time slot of each pulse group at which the channel identification is inserted is that just after the signal switching circuit 30 is switched over, so that the period of the pulses corresponding to this time slot is unstable. Therefore, it follows that only the pulses showing correct information concerning the inductance of the respective coils are included in each pulse group.

The synthetic output pulse signal $P_0$ shown in FIG. 4C is applied to a processing device 42 to compute the ratio of the period $T_c$, which is the period of four cycles of the first pulse signal included in the first pulse group, to the period $T_d$, which is the period of four cycles of the second pulse signal included in the second pulse group. The result of the computation is output as position data $D_p$ in digital form.

The inductance value of the reference coil 24 is a predetermined fixed value, so that the value of $T_d$ is constant regardless of the position of the object 22. However, the value of $T_d$ is affected by the changes in temperature and/or the crest value of the pulse signal $PS_2$ at the same time and to the same degree as the changes affect the value of $T_c$.

Therefore, similarly to the case of circuit 1, when the calculation of $T_c/T_d$ is carried out, it follows that errors in the data showing the position of the object arising because of changes in the temperature and/or the level of the pulse signal $PS_2$ can be eliminated. As a result, extremely accurate detection of the position of the object can be realized with relatively simple circuit structure as in the case of the circuit 1.

In addition, with this circuit arrangement, it is also possible to realize easy adjustment of the position signal generating circuit 21 per se by employing variable elements for the resistors 26 and 31.

The circuit 31 shown in FIG. 3 has the same advantages as those of the position signal generating circuit 1 described above.

Figure 5:
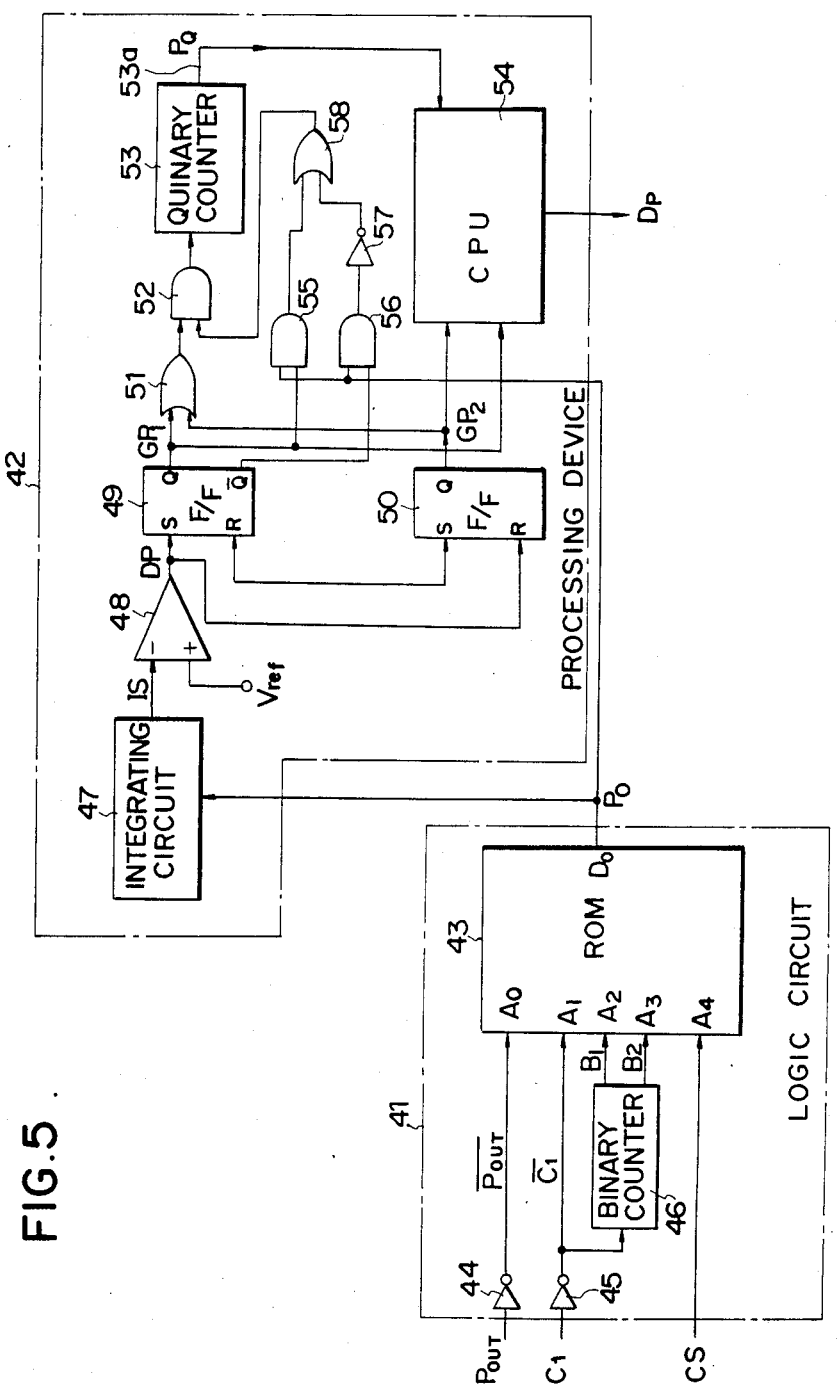
FIG. 5 is a detailed block diagram of the logic circuit and the processing device shown in FIG. 3.

FIG. 5 is a detailed block diagram of the logic circuit 41 and the processing device 42 shown in FIG. 3. The logic circuit 41 has a read only memory (ROM) 43 having five input terminals $A_0$ to $A_4$, and an inverted output pulse signal $P_{out}$ generated from an inverter 44 to which the output pulse signal $P_{out}$ is applied and an inverted output pulse $\overline{C_1}$ generated from an inverter 45 to which the output pulse $C_1$ is applied are applied to the input terminals $A_0$ and $A_1$, respectively. The inverted output pulse $\overline{C_1}$ is also applied to a binary counter 46 from which an output signal $B_1$ with a period two times longer than that of the inverted output pulse $\overline{C_1}$ and an output signal $B_2$ with a period four times longer than that of the inverted output pulse $\overline{C_1}$ are produced. The output signals $B_1$ and $B_2$ are applied to the input terminals $A_2$ and $A_3$ of the ROM 43 as information representing times equal to two periods and four periods of the inverted output pulse $\overline{C_1}$. The switching control signal CS is applied to the input terminal $A_4$ of the ROM 43.

The set of data applied to the input terminals $A_0$ to $A_4$ is applied as address data to the ROM 43, and whichever of "0" and "1" is stored at the address designated by the address data is output as the synthetic output pulse signal $P_0$ from the data output terminal $D_0$. That is, the respective signals mentioned above are applied to the input terminals $A_0$ to $A_4$ as information necessary and sufficient for determining the level of the synthetic output pulse signal $P_0$ at that time, and information concerning the level of the synthetic output pulse signal $P_0$ for all possible combinations of these signals is stored at the addresses desigated by these signals.

As a result, on the basis of the information applied to the input terminals $A_0$ and $A_4$, it is possible to obtain the synthetic output pulse signal $P_0$ shown in FIG. 4C from the ROM 43.

The processing device 42 has an integrating circuit 47 for integrating the synthetic output pulse $P_0$ and the integrated signal IS from the integrating circuit 47 is applied to the negative input terminal of a voltage comparator 48 having a positive input terminal to which a reference voltage $V_{ref}$ is applied. As will be understood from FIG. 4C, the longest "L" level term in the synthetic output pulse $P_0$ is an "L" level term corresponding to two periods of the second pulse signal which is added to each head portion of the pulse groups $Y_1$, $Y_2$, . . . . Therefore, the level of the integrated signal IS assumes the lowest condition during this term.

To detect the lowest condition of the level of the integrated signal IS, the level of the reference voltage $V_{ref}$ is set in advance so as to be slightly larger than the minimum level of the integrated signal IS expected beforehand. As a result, the detecting pulse DP, which indicates the timing of the "L" level region of each head portion of the pulse groups $Y_1$, $Y_2$, . . . , is generated from the voltage comparator 48.

The detecting pulse DP is applied to the set terminal of a R-S flip-flop 49 and the reset terminal of a R-S flip-flop 50, and a first gate pulse $GP_1$ whose level stands up in response to the standing-up of the level of the detecting pulse DP is produced from the Q output terminal of the R-S flip-flop 49. The first gate pulse $GP_1$ is applied to one input terminal of an AND gate 52 through an OR gate 51.

In order to supply an inverted pulse signal of the synthetic output signal $P_o$ through the AND gate 52 to the quinary counter 53 during the "L" level term of the first gate pulse signal $GP_1$, a logic circuit having AND gates 55 and 56, an inverter 57 and an OR gate 58 is provided. The synthetic output pulse signal $P_o$ is applied to each input terminal of the AND gates 55 and 56 and the first gate pulse signal $GP_1$ and the inverted first gate pulse signal $\overline{GP_1}$ from the $\overline{Q}$ output terminal of the flip-flop 49 are applied to the other input terminals of the AND gates 55 and 56, respectively. The output terminal of the AND gate 55 is connected to one input terminal of the OR gate 58 and the output terminal of the AND gate 56 is connected through the inverter 57 to the other input terminal of the OR gate 58. The output terminal of the OR gate 58 is connected to the other input terminal of the AND gate 52. As a result, the synthetic output pulse signal $P_o$ is applied to the quinary counter 53 when the level of the first gate pulse signal $GP_1$ is "H", while the inverted signal of the synthetic output pulse signal $P_o$ is applied to the quinary counter 53 when the level of the first gate pulse signal $GP_1$ is "L".

The quinary counter 53 is responsive to the rising edge of the input pulse signal and produces an output pulse $P_Q$ on the output line $53_a$ thereof once for every five pulses applied through the AND gate 52 to the quinary counter 53. The output pulse $P_Q$ is applied to the reset terminal R of the R-S flip-flop 49 and the set terminal S of the R-S flip-flop 50.

Consequently, the R-S flip-flop 49 is set at the rising time of the detecting pulse DP and reset at the time the output pulse $P_Q$ is generated just after five pulses constituting the synthetic output pulse signal $P_0$ or the inverted signal thereof have been output, so that the level of the first gate pulse $GP_1$ is "H" only during the period between the time the R-S flip-flop 49 is set and the time the R-S flip-flop 49 is reset.

On the other hand, since the R-S flip-Flop 50 is set at the time of the occurrence of the output pulse $P_Q$ and reset at the time of the occurrence of the detecting pulse DP, the level of the second gate pulse $GP_2$ output from the Q output terminal of the R-S flip-flop 50 becomes "H" only during the period between the occurrence of the output pulse $P_Q$ and the detecting pulse DP.

That is, the level of the first gate pulse $GP_1$ becomes "H" in correspondence to at least the four periods of the second pulse signal including each of pulse groups $Y_1$, $Y_2$, . . . , while the level of the second gate pulse $GP_2$ becomes "H" in correspondence to at least the four periods of the first pulse signal included in each of pulse groups $X_1$, $X_2$, . . . .

The first and the second gate pulses $GP_1$ and $GP_2$ are applied to the central processing unit (CPU) 54, to which the output pulse $P_q$ is applied as a signal indicating which pulse group the presently applied output pulse belongs to. Therefore, a series of four periods of the first pulse signal can be distinguished from a series of four periods of the second pulse signal with reference to the first and the second gate pulses $GP_1$ and $GP_2$ and the times $T_c$ and $T_d$ can be computed in the CPU 54 to obtain the data showing the ratio between the time $T_c$ and the time $T_d$ as the position data $D_p$.

According to the circuit of the present invention, since the position signal indicative of the position of the object under detection can be directly obtained in digital form without the use of a complex circuit structure, no analog-digital converter is required even when the circuit is applied to a control system using a microprocessor. Thus the cost of the control system can be reduced. Furthermore, since any stray capacity that may exist in the wiring between the coils and the pulse generator does not affect the detecting accuracy, no trouble arises even when the coils are located at a position remote from the circuit.

We claim:

1. A circuit for generating a position signal in digital form showing the position of an object under detection, comprising:
    a pulse generator for generating a pulse signal;
    a first detecting means which includes a first coil whose inductance value varies in accordance with the position of the object and generates a first pulse response signal relating to the inductance value of the first coil in response to the pulse signal;
    a second detecting means which includes a second coil with a constant inductance value and generates a second pulse response signal relating to the inductance value of the second coil in response to the pulse signal; and
    output means for producing a digital signal corresponding to a ratio between the inductance value of the first coil and that of the second coil as a digital position signal in response to at least the first and second pulse response signals, said output means including:
    switching means for alternately taking out the first pulse response signal and the second pulse response signal,
    a pulse signal generating means responsive to the output signal from the switching means for alternately generating a first pulse signal with a period corresponding to the inductance value of the first coil and a second pulse signal with a period corresponding to the inductance value of the second coil,
    means for applying the output pulse signal from the pulse signal generating means as a synchronizing signal to said pulse generator,
    means for generating a switching control signal for operating the switching means in response to the output signal from the pulse signal generating means, and
    a computing means for computing a ratio between the inductance value of the first coil and that of the second coil in response to the first and second pulse signals, and
    wherein said pulse generator generates the pulse signal synchronized with the output pulse signal from the pulse signal generating means, whereby the output digital data from said computing means can be used as digital position data.

2. The circuit as claimed in claim 1 wherein a signal whose level rising characteristic varies in accordance with the inductance value of the first coil is produced from said first detecting means as the first pulse response signal, and a signal whose level rising characteristic varies in accordance with the inductance value of the second coil is produced from said second detecting means as the second pulse response signal.

3. The circuit as claimed in claim 2 wherein said first detecting means has a first resistor connected between the output of the first coil and ground and the first pulse response signal is developed across the first resistor in response to the application of the pulse signal to the input of the first coil, and said second detecting means has a second resistor connected between the output of the second coil and ground and the second pulse response signal is developed across the second resistor in response to the application of the pulse signal to the input of the first coil.

4. The circuit as claimed in claim 1 wherein the pulse signal generating means is a voltage comparator in which a level of the output signal from the switching means is compared with a predetermined reference level to produce the first and second pulse signals.

5. The circuit as claimed in claim 1 wherein the switching control signal generating means is a circuit for generating a signal whose level is alternately changed in relation to a number of the pulses of the first and second pulse signals.

6. The circuit as claimed in claim 5 wherein the switching control signal generating means is a frequency divider for dividing the first and second pulse signals in frequency.

* * * * *